Jan. 3, 1939.   J. B. BAKER   2,142,931
ROLLER BEARING
Filed June 22, 1938
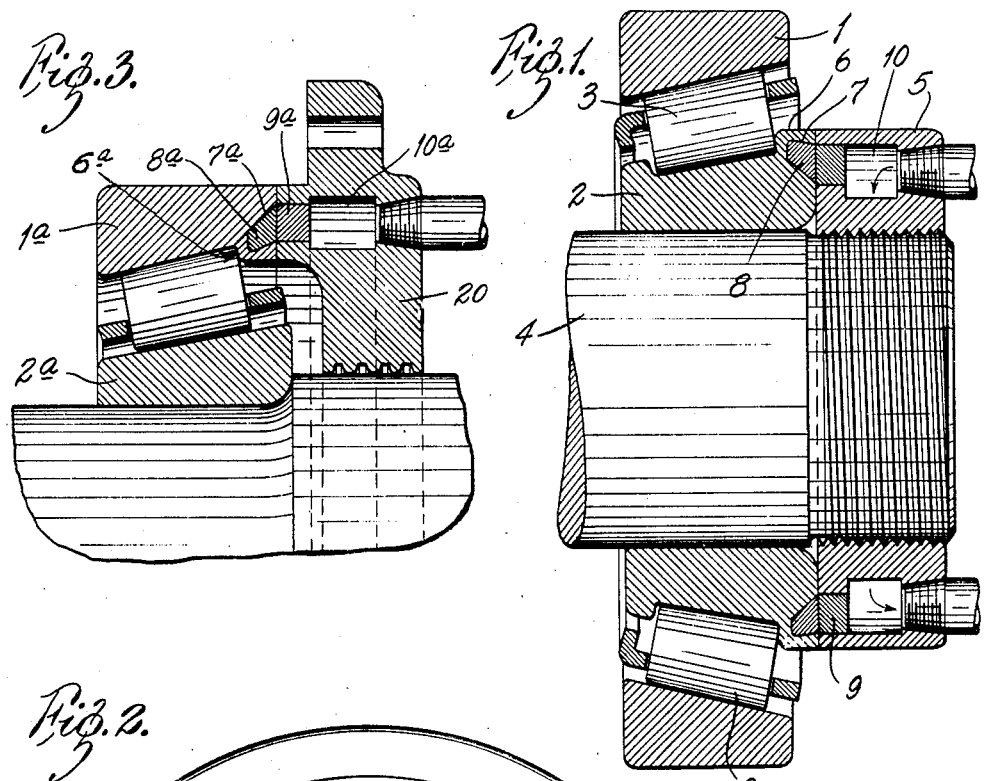
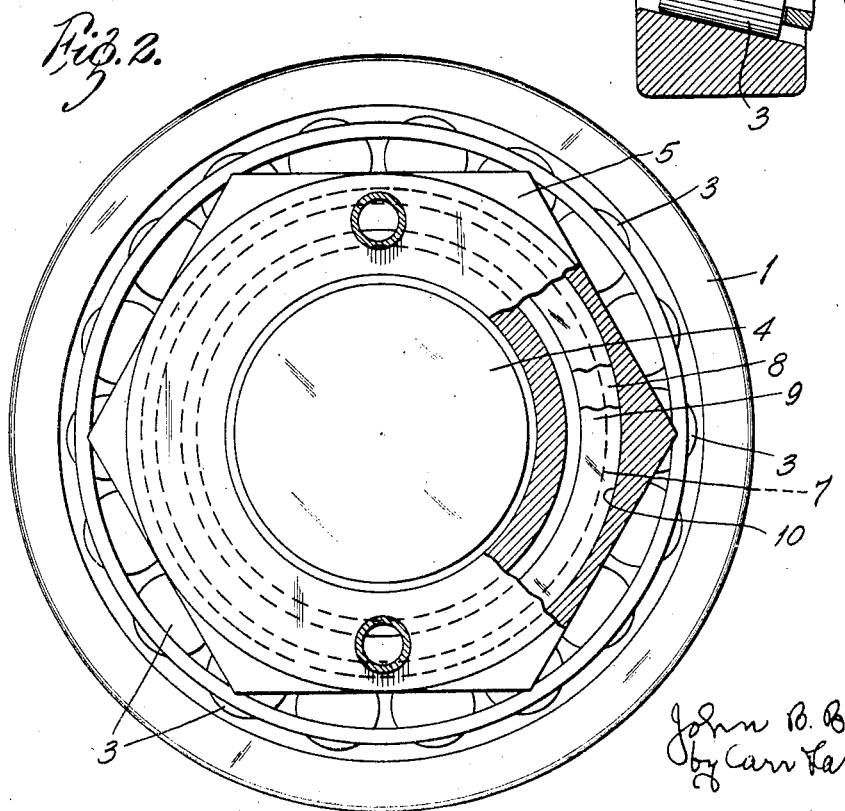
INVENTOR:
John B. Baker,
by Carr, Carr & Gravely,
HIS ATTORNEYS.

Patented Jan. 3, 1939

2,142,931

UNITED STATES PATENT OFFICE 2,142,931

ROLLER BEARING

John B. Baker, Canton, Ohio, assignor to The Timken Roller Bearing Company, Canton, Ohio, a corporation of Ohio Application June 22, 1938, Serial No. 215,207

5 Claims. (Cl. 308—216)

My invention relates to roller bearings, particularly to taper roller bearings intended for use at very high speeds with resultant possible heating of the thrust rib for the rollers. The invention has for its principal object to dissipate the heat of such thrust rib and thus prevent overheating of the bearing.

The invention consists principally in providing the back face of the bearing member with an annular recess extending into the thrust rib of the bearing member and placing in such recess an insert of heat conducting material. The invention also consists in the roller bearing and in the parts and combinations of parts hereinafter described and claimed.

In the accompanying drawing,

Fig. 1 is a longitudinal sectional view of a taper roller bearing whose inner bearing member is made in accordance with my invention;

Fig. 2 is an end view thereof; and

Fig. 3 is a longitudinal sectional view of a bearing whose outer bearing member is made in accordance with my invention.

In Fig. 1 is shown a taper roller bearing including a rotating outer bearing member or cup 1, a stationary cone 2 or inner bearing member, conical rollers 3 therebetween, and an axle 4 or other seat for said cone. Said bearing cone 2 is held on said axle 4 by means of a nut 5.

The cone 2 has a thrust rib 6 at the large end of its raceway for engagement with the large ends of the rollers 3. Said thrust rib 6 is the portion of the bearing most subject to overheating when the bearing rotates at high speeds; and the present improvement is concerned with the prevention of overheating. The back face of the bearing cone 2 and thrust rib 6 is provided with an annular recess 7 extending into the thrust rib 6 but stopping far enough short of the thrust face thereof to prevent weakening said rib. In said annular recess 7 is an insert 8 of copper, aluminum or some other metal which is a good conductor of heat. Thus heat will be dissipated from the thrust rib.

In special installations where conditions are such as to increase the possibility of overheating, said nut may be provided with a heat conducting insert 9 in the face thereof in contact with the thrust rib, the two inserts 8 and 9 being in engagement with each other. The nut 5 may also be provided with an annular channel 10 through which a cooling liquid may circulate over said insert 9.

In the construction shown in Fig. 3, the cone 2a rotates and the cup 1a is stationary, the thrust rib 6a for the rollers being in said cup 1a. The back face of the cup 1a is provided with an annular recess 7a in which is mounted a heat conducting insert 8a. The backing member 20 for the cup may also be provided with a heat conducting insert 9a and with a channel 10a for circulation of a cooling liquid.

The above described construction is excellently adapted for those special bearing installations where the bearing is particularly subject to heating of the thrust rib. Such installations are comparatively few, but those few raise a serious problem which is solved by the present invention and which has not heretofore been solved.

What I claim is:

1. In a roller bearing, a bearing member having a thrust rib, the back face of said thrust rib and bearing member having an annular recess and an insert of heat conducting material in said recess.

2. In a roller bearing, a bearing cone having a thrust rib, the back face of said thrust rib and bearing cone having an annular recess and an insert of heat conducting material in said recess.

3. In a roller bearing, a bearing cup having a thrust rib, the back face of said thrust rib and bearing cup having an annular recess and an insert of heat conducting material in said recess.

4. In a roller bearing, a bearing member having a thrust rib, the back face of said thrust rib and bearing member having an annular recess and an insert of heat conducting material in said recess and a positioning member having a face in contact with said bearing member, said positioning member having a heat conducting insert in contact with the insert of said bearing member.

5. In a roller bearing, a bearing member having a thrust rib, the back face of said thrust rib and bearing member having an annular recess and an insert of heat conducting material in said recess and a positioning member having a face in contact with said bearing member, said positioning member having a heat conducting insert in contact with the insert of said bearing member, said positioning member also having an annular channel for circulation of cooling liquid over the heat conducting insert thereof.

JOHN B. BAKER.